United States Patent [19]

Console et al.

[11] 3,982,481

[45] Sept. 28, 1976

[54] FOOD PROCESSING APPARATUS

[76] Inventors: Edward T. Console, 39 Gonzales St.;
Anthony G. Wilson, 48 Eaton Ave.,
both of Watsonville, Calif. 95076;
Joseph G. Lamandri, 205
Harkleroad Ave., Santa Cruz, Calif.
95060

[22] Filed: Aug. 18, 1972

[21] Appl. No.: 281,974

[52] U.S. Cl. ................................................. 99/477
[51] Int. Cl.² ........................................... A47J 27/58
[58] Field of Search ............ 99/443, 467, 468, 473,
99/474, 483, 484, 486, 487, 646, 477

[56] References Cited
UNITED STATES PATENTS

| | | | |
|---|---|---|---|
| 2,278,701 | 4/1942 | Karr | 99/483 |
| 2,534,648 | 12/1950 | Wilbur | 99/443 C X |
| 2,631,628 | 3/1953 | Martin | 99/474 |
| 2,868,616 | 1/1959 | Poitras | 126/20 UX |
| 2,948,619 | 8/1960 | Ashley | 99/483 |
| 3,086,444 | 4/1963 | De Back | 99/483 |
| 3,189,460 | 6/1965 | Smith | 99/473 X |
| 3,263,592 | 8/1966 | Hickey et al. | 99/443 C X |
| 3,715,975 | 2/1973 | King | 99/486 X |
| 3,721,179 | 3/1973 | Applegate | 99/487 |
| 3,733,202 | 5/1973 | Marmor | 99/404 X |

*Primary Examiner*—Billy J. Wilhite
*Assistant Examiner*—Arthur O. Henderson

[57] ABSTRACT

A continuous conveyer-type blanching apparatus utilizing steam as the blanching medium having a conveyer belt for transporting produce through a blanching chamber in which a plurality of venturi nozzles directs a mixture of high pressure supply steam and recycled chamber steam at the produce, the chamber steam being drawn from the blanching chamber into ports in the venturi nozzles by a low venturi pressure created by the high velocity of the exiting supply steam, the chamber steam being continuously recycled until it dissipates becoming a condensate which is utilized to heat presoaking water for the produce before it enters the blanching chamber.

5 Claims, 7 Drawing Figures

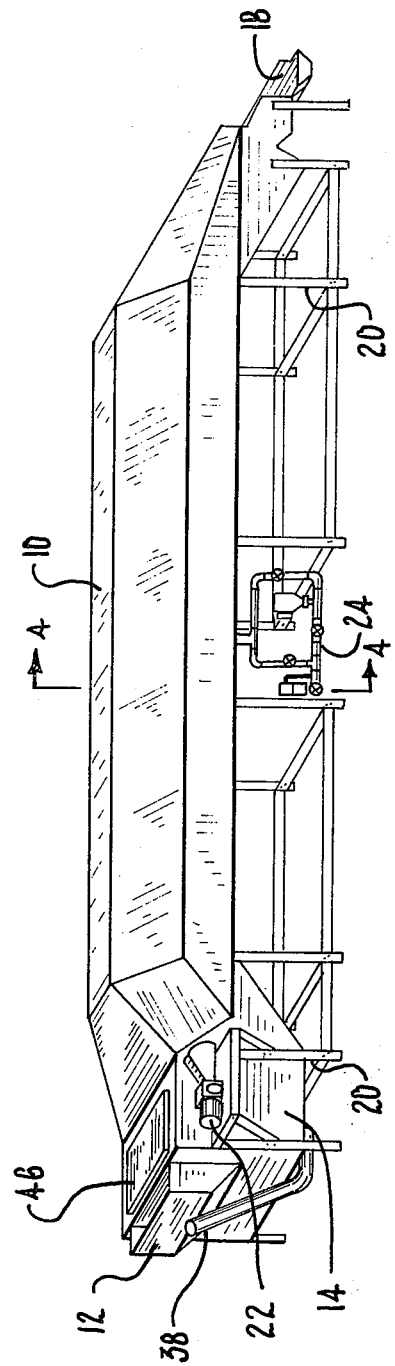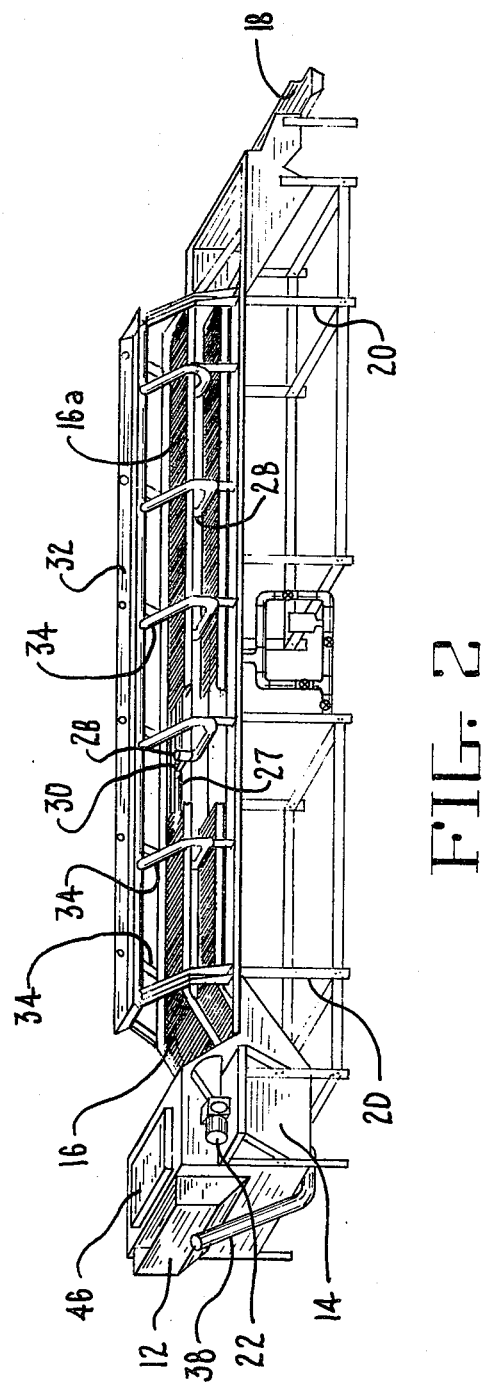

FOOD PROCESSING APPARATUS

BACKGROUND OF THE INVENTION

This invention relates to apparatus with a conveyor for continuous cooking of a variety of foods. The apparatus is particularly suited for produce processing known as blanching which is a hot water or steam treatment of raw produce to inactivate enzymes which cause deterioration before subsequent processing. In a continuous blanching operation raw food products enter a blanching chamber and are subjected to a scalding water or steam for a period varying from seconds to a number of minutes at a temperature generally not more than 212° F. The treated food products which exit the blanching chamber are stored, transported or subjected to additional processing.

In a steam blanching operation, there has heretofore been a substantial loss of steam which is vented to the atmosphere in order to permit the introduction of additional higher temperature steam for proper circulation in the chamber. It is a primary object of this invention to recirculate all usable cooking steam within the chamber until lost by dissipation as a condensate. It is another object of this invention to utilize this condensate to heat water for presoaking food products or produce before they enter the blancher.

SUMMARY OF THE INVENTION

The present invention comprises apparatus for continuous cooking or blanching of food products, particularly produce. The apparatus employs a conveyer to transport food products deposited in a component presoaking bin from the bin to an elongated cooking or blanching chamber. The conveyer is formed of a flexible grate or mesh and supports the products evenly distributed on its upper surface as they are transported through the chamber. The cooking or blanching is accomplished by a plurality of spaced nozzles arranged under the conveyer supporting the products. The nozzles direct steam upwardly through the grate or mesh of the conveyer at the food products causing them to be cooked or blanched. Rather than permitting steam emitted from the nozzles to escape or be vented to the atmosphere after being released in the chamber, the steam is collected and recycled or recirculated until it dissipates as a condensate on the walls of the chamber. The condensate is also utilized by being drained to the presoaking bin, thereby heating the water in the bin and providing a continuous supply of clean distilled water for cleansing and soaking the food products deposited in the presoaking bin.

The recycling of steam is accomplished by collecting the steam released in the chamber and conveying the collected steam in a conduit to the emission nozzles to be mixed with high temperature, high pressure supply steam from an outside supply which is provided to continually replenish steam losses through condensation. While such recycling may be accomplished by a pump, a far more efficient means has been discovered. By designing the emission nozzles as a venturi, the high pressure supply steam emitted at high velocity creates a low pressure zone in the nozzle. Collected steam can be drawn into this low pressure zone through ports and mixed with the emitted supply steam before final emission into the chamber at the nozzle orifice. A regulated supply steam will thus maintain predetermined cooking or blanching temperatures, replace condensate losses, and perform the work in recycling steam previously released in the chamber.

While the apparatus can be employed for either cooking or blanching a variety of food products, the preferred embodiment described in detail will, for convenience, be referred to as a blanching apparatus for the blanching of produce.

DETAILED DESCRIPTION OF THE DRAWINGS

FIG. 1 is a perspective view of a produce blanching apparatus.

FIG. 2 is a perspective view of the apparatus of FIG. 1 with cover removed.

DETAILED DESCRIPTION OF THE INVENTION

Figure 3:
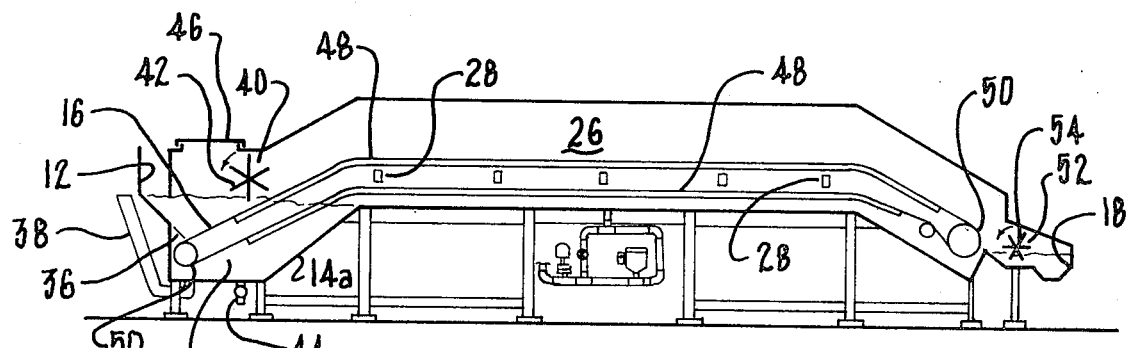
FIG. 3 is a schematic view of the conveyor arrangement.

Referring to FIG. 1, a produce blanching apparatus is shown having an elongated blanching chamber formed largely by a removable hood 10 which covers most of the apparatus. Produce to be blanched is deposited in a receiving chute 12 which empties into a presoaking bin 14 at one end of the apparatus. A mesh or flexible grate conveyer 16, visible in FIG. 2, picks up the produce and transports it to a cold water post soaking flume 18 at the other end of the apparatus. The produce is then flushed or removed and transported to any of a variety of subsequent operations. The entire apparatus is supported on a plurality of support legs 20 and is self contained except for an outside power supply and a high pressure steam supply.

The power supply operates a conveyer motor 22 (only one shown in FIG. 1) at each end of the blanching apparatus and certain automatic controls 24, which will be discussed in greater detail with reference to FIG. 5. The high pressure steam supply is used as the blanching and recirculating medium in the blanching chamber 26, schematically illustrated in FIG. 3.

Referring to FIG. 2, the blanching apparatus is shown with the cover removed revealing the principle elements within the blanching chamber. A centrally located supply header 27 delivers high pressure steam along the length of the blanching chamber. The supply header 27 delivers the steam to each of a plurality of spaced emission nozzles 28 through a small feeder line 30 for each nozzle, an example of which is more clearly visible in FIGS. 4 and 6. The nozzles 28 are arranged between the conveyer loop and are directed upwardly at the underside of the transport portion 16a of the endless conveyer 16. The nozzles 28 are arranged on each side of the supply header and are staggered to more evenly distribute emitted steam through the mesh or grate of the conveyer to contact the produce carried thereon.

Above the conveyer 16 is an open-trough manifold 32 that collects steam that has been released by the nozzles and has passed through the conveyer and rises to the upper portion of the blanching chamber. A plurality of arched return pipes 34 provide a communication or conduit between the steam collection manifold 32 and each of the nozzles 28 for recycling steam emitted in the blanching chamber by the nozzles. The manner in which the steam is conveyed from the manifold 32 to the nozzles is described in greater detail with reference to FIGS. 4, 6 and 7.

Referring to the schematic illustration of FIG. 3, the basic elements employed for the transport of produce from the entering end to the exiting end of the blanching apparatus are shown. Produce is deposited in the receiving chute 12 and slides into the presoaking bin 14. The produce either floats or is guided by a baffle 36 to the end of the conveyer 16 which is partially submerged in water. A constant water level is maintained by an overflow standpipe 38, thereby preventing the water level from rising into the blanching chamber 26. As the produce rises on the conveyer 16 it passes under a rotating radial blade or paddle-wheel valve 40 which cooperates with a flap 42 to seal the blanching chamber 26 and prevent circulating steam therein from escaping over the top of the paddle-wheel valve 40. The paddle-wheel valve 40 also contacts the surface of the water and thereby prevents steam from escaping under the paddle-wheel valve 40 as well as assisting in urging floating produce onto the conveyer 16. The conveyer motor 22, which powers the conveyer 16, is also utilized for belt powering the paddle-wheel valve 40. Produce rising on the conveyer dewaters over the presoaking bin 14 which has a sloping wall 14a to extend its effective surface area at the water level.

Cleanout of debris which sinks to the bottom of the presoaking bin or falls through the mesh or grate of the conveyer is periodically accomplished by draining the water in the presoaking bin through drain plug 44 and removing the debris through a cleanout cover 46.

The produce is conveyed through the elongated blanching chamber 26 on the conveyer 16 which is supported on three spaced rails 48 extending nearly the entire length of both the transport and return portions of the conveyer (only visible on each portion in FIG. 3). The rails 48 are coated with Teflon on their supporting surface to permit the mesh or grate of the conveyer to slide with low friction on the rails between the drive rollers 50 at each end of the conveyer 16.

In the blanching chamber 26 the produce is subjected to a steam treatment from the emission nozzles 28 as well as the circulating steam already in the chamber before being transported to the downwardly sloping end of the conveyer and dumped into a cold water outlet flume 18. At the outlet flume 18 a second paddle-wheel valve 52 cooperates with a flap 54 and the water level in the flume 18 to seal the blanching chamber and prevent the escape of steam. The water level in the flume is maintained by a dam over which feed water and the blanched produce is carried for a subsequent operation.

Figure 4:
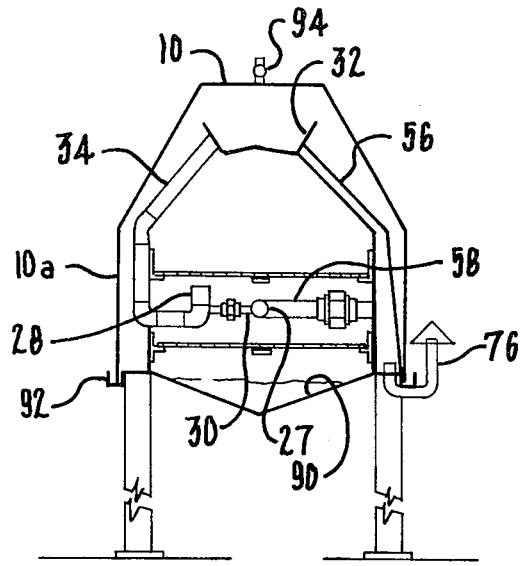
FIG. 4 is a sectional view taken on the lines 4—4 in FIG. 1 with parts omitted.

The steam emission and recycling system is most clearly illustrated in FIG. 4, which discloses a section of the blanching chamber revealing one of the numerous nozzle and arched return pipe combinations which are alternately positioned on each side of the conveyer along a major portion of its length. In FIG. 4 the steam emission nozzle 28 is shown directed at the underside of the mesh or grate of the conveyer 16. The emission nozzle 28 is connected to an arched return pipe 34 which loops around the conveyer 16 to the steam collection manifold 32 supported on brackets 56 above the conveyer. The small feeder line 30, also connected to the emission nozzle 28, directly supplies high temperature, high pressure steam from the supply header 27, which runs in the center of the blanching chamber. A supply line 58 connects the supply header 27 to the automatic controls 24, which are outside the chamber as shown in FIG. 5.

Figure 5:
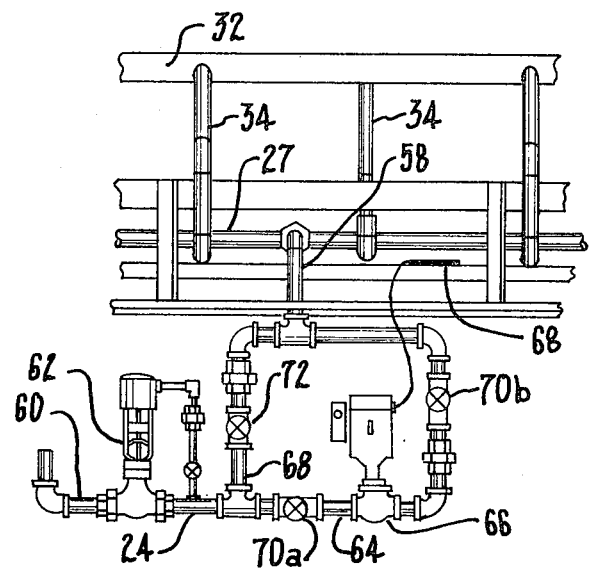
FIG. 5 is an enlarged fragmentary elevational view of the controls for the supply steam line.

Referring to FIG. 5, steam from an external high pressure supply having a line pressure of approximately 125 p.s.i. enters a high pressure line 60 and is reduced to approximately 40 p.s.i. by an automatic pressure regulating valve 62. The main supply line 64 for the reduced pressure steam is then further regulated by a modulating electrically controlled valve 66 which is responsive to a temperature probe 68 located in the blanching chamber. The modulating valve 66 is thus able to control the temperature in the blanching chamber by controlling the introduction of high temperature steam into the chamber. The modulating valve 66 can be by-passed by closing two conventional valves 70a and b on the main supply line 64 and opening a valve 72 on a by-pass line 74 for direct introduction of reduced pressure steam into the blanching chamber. The by-pass line 74 may be advantageously employed for the slow introduction of steam when initially starting the blancher to allow cold air to be dropped to the bottom of the chamber by the heat and pressure of the introduced steam and be vented to the atmosphere by an open vent 76 shown in FIG. 4.

Figure 6:
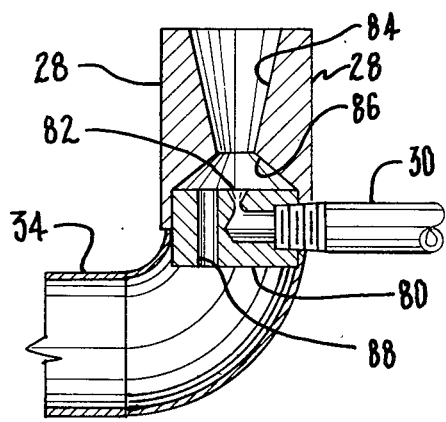
FIG. 6 is an enlarged fragmentary sectional view of the steam emission nozzle.
Figure 7:
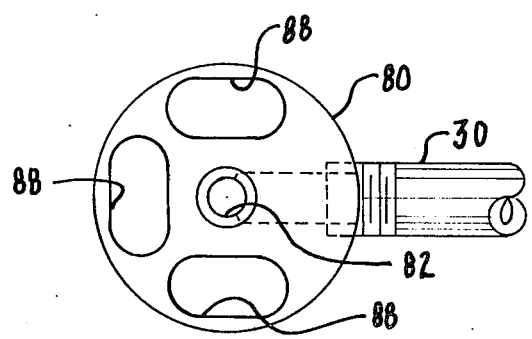
FIG. 7 is an enlarged plan view of the port plate for the nozzle of FIG. 6.

Referring to FIGS. 6 and 7, the emission nozzle 28, is constructed in the fashion of a venturi for the emission of high pressure steam from the feeder line 30 and recycled steam from the blanching chamber 26. The feeder line 30 enters the center of a manifold plate 80 which has an expansion orifice 82 for directing steam out a complementary open expansion chamber 84 in the emission nozzle 28. Between the expansion orifice 82 of the manifold plate 80 and the expansion chamber 84 in the emission nozzle 28 is a mixing chamber 86 in the nozzle which communicates with the return pipe 34 through three recirculation ports 88 in the manifold plate. The high pressure supply steam passing through the mixing chamber at high velocity creates a low pressure interface in the mixing chamber 86 causing recirculation of steam to be sucked through the recirculation ports 88 and mixed with the supply steam on passage through the expansion chamber 84. The steam mixture is then emitted into the blanching chamber 26.

Referring again to FIG. 5, the venturi action of the emitted supply steam creates the necessary suction to draw recirculating steam from the blanching chamber into the collection manifold 32 and through the return pipes 34 to the emission nozzle. During this steam recycling, a portion of the steam in the blanching chamber is continually dissipated by condensing. Droplets of steam condensate in the blanching chamber fall to the bottom of the chamber and are collected by a V-shaped collection panel 90. The collection panel 90 is sloped toward the presoaking bin 14 as shown in FIG. 3 to deliver the hot condensate to the bin 14.

Steam which condenses on the walls 10a of the hood 10, runs down into a U-shaped sealing trough 92. The collected steam in the sealing trough 92 provides an air-tight seal for the removable hood 10.

While it is not desirable to vent useful steam which is circulating in the blanching chamber, it is desirable and necessary to vent other non-condensable gases which build up in the chamber during its operation. Gases heavier than steam are vented through the open vent 76 mounted low in the blanching chamber. Gases lighter than steam are vented through a vent cock 94 which is periodically opened to allow accumulated gases to escape through the top of the hood 10.

The essentially closed system for steam circulation permits a maximum energy utilization of supplied steam and practically eliminates the undesirable release of steam into the atmosphere.

We claim:

1. Apparatus for food processing with steam comprising:
   a steam chamber,
   a conveyor through said chamber for food transport,
   a plurality of steam emission nozzles communicating with said chamber and directed at said conveyor,
   a steam supply connected to said nozzles, and steam return means above said conveyor for collecting steam and being connected to said nozzles and communicating with said chamber for recirculating steam in said chamber, said nozzles comprising venturis for mixing steam from said steam supply and said steam return means.

2. The apparatus of claim 1 further comprising
   means for sensing the temperature in said chamber, and
   means responsive to said temperature sensing means for regulating the flow of said steam supply.

3. The apparatus of claim 1 further comprising a presoaking container communicating with said steam chamber.

4. The apparatus of claim 3 wherein said conveyor further is through said presoaking container and is totally contained within said presoaking container and said steam chamber.

5. The apparatus of claim 4 further comprising
   a receiving chute for food communicating with said presoaking container, and
   a post soaking flume communicating with said steam chamber.

* * * * *